M. C. FRINS.
SPEED CHANGE MECHANISM.
APPLICATION FILED JULY 16, 1920.

1,375,216.

Patented Apr. 19, 1921.

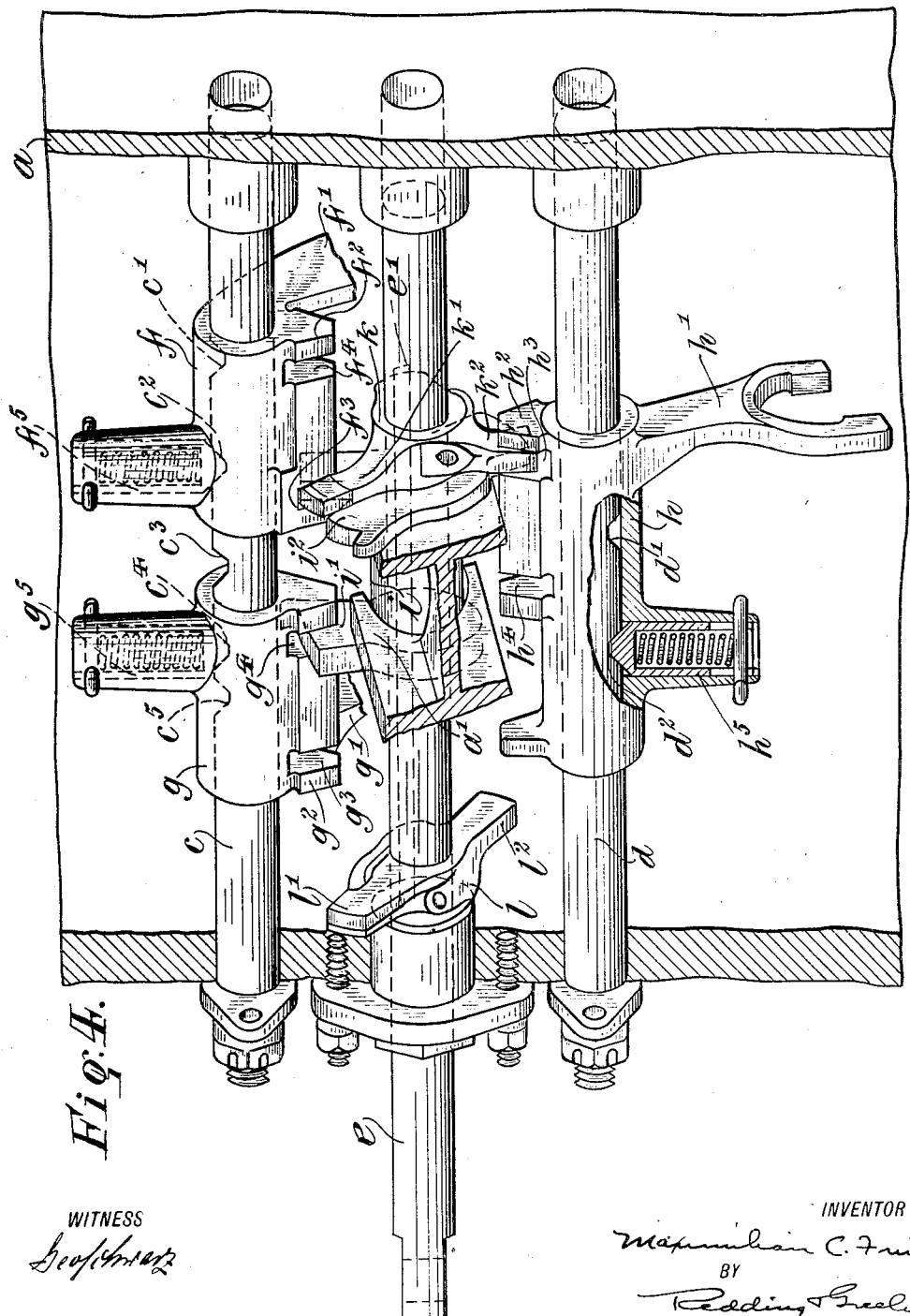

UNITED STATES PATENT OFFICE.

MAXIMILIAN C. FRINS, OF NEW YORK, N. Y., ASSIGNOR TO INTERNATIONAL MOTOR COMPANY, OF NEW YORK, N. Y., A CORPORATION OF DELAWARE.

SPEED-CHANGE MECHANISM.

1,375,216.   Specification of Letters Patent.   Patented Apr. 19, 1921.

Application filed July 16, 1920. Serial No. 396,699.

*To all whom it may concern:*

Be it known that I, MAXIMILIAN C. FRINS, a citizen of the United States, residing in the borough of Manhattan of the city of New York, in the State of New York, have invented certain new and useful Improvements in Speed-Change Mechanism, of which the following is a specification, reference being had to the accompanying drawings, forming a part hereof.

This invention relates to an improved change speed mechanism for motor vehicles and has for its object to provide an improved construction which is simple, compact, positive and self-locking under all conditions of use. More particularly, the invention relates to a transmission designed with reference to the employment of four speeds forward and reverse. In accordance with the invention the forks for the first and second, and for the third and fourth speeds are mounted on the same support, but are engageable by separate shifting fingers and adapted to be locked by independent locking members. The shifter fork for reverse speed is mounted on an independent support but is engageable by the shifter member of one of the aforementioned forks and is adapted to be locked by one of the locking members therefor. With the close interrelation of parts described and the dual functioning of several of the elements, the construction is, nevertheless, readily accessible, the parts are readily assembled and disassembled and ample clearance is afforded for all necessary movements.

A further object of the invention is to provide means carried with the gear case for maintaining the locking members in proper relation to the respective shifter forks. Still another object is to provide a slidable selector shaft to which may be secured fixedly independent shifter members for the various forks and independent but interconnected locking members therefor feathered on the selector shaft so as to rock therewith but permit free relative axial movement between the shaft and the locking members. The invention will be described in detail in connection with the accompanying drawings in which—

Fig. 4 is a view in perspective looking down on the shifting mechanism shown in the foregoing figures, the view being on a somewhat larger scale.

The invention is not concerned with the details of construction of the selective speed transmission with which the improved shifting mechanism is associated, but it will be described in connection with a four speed forward and reverse sliding gear set of modern type, so much of the transmission being illustrated as is necesssary for an understanding of the relation thereto of the present improvements. The gear box $a$ has mounted therein the change speed gearing indicated generally at $b$ and the end walls of the gear box support in proper position above the gearing $b$ two fixed rods $c, d$ and the sliding selector shaft $e$. The rods $c, d$, and the selector shaft $e$ can, in the present construction, be supported in substantially the same horizontal plane, which makes for great convenience in assembling and facilitates the operations of manufacture. The rods $c, d$ are secured removably in position as is the rocking selector shaft $e$, in order to facilitate initial assembling and the disassembling of parts for replacement or repair.

The principle on which the invention is based will find embodiment in constructions differing in details as regards the particular forks, shifter fingers and locking members illustrated, but since it is conductive to a clear understanding of the invention to set out with great particularity one practical embodiment, the detailed description following hereinafter is to be read as applying only to said embodiment and not as limiting the incorporation of the invention in transmissions employing a different relationship of parts.

Figure 1:
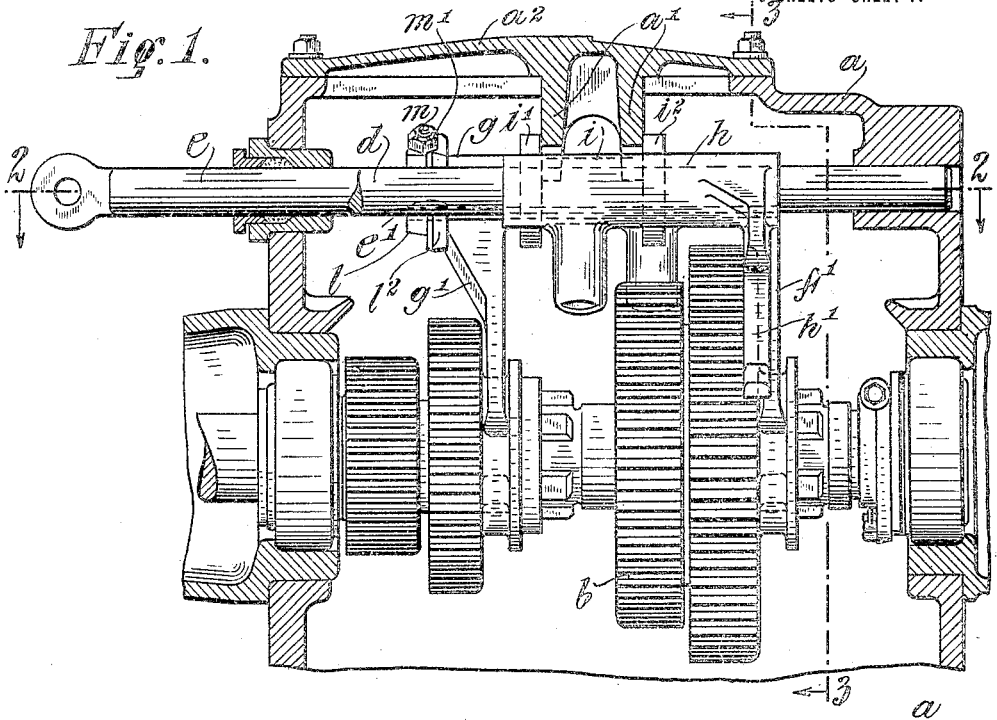
Figure 1 is a view in vertical section of a portion of a gear case in which the improved change speed mechanism is incorporated.
Figure 2:
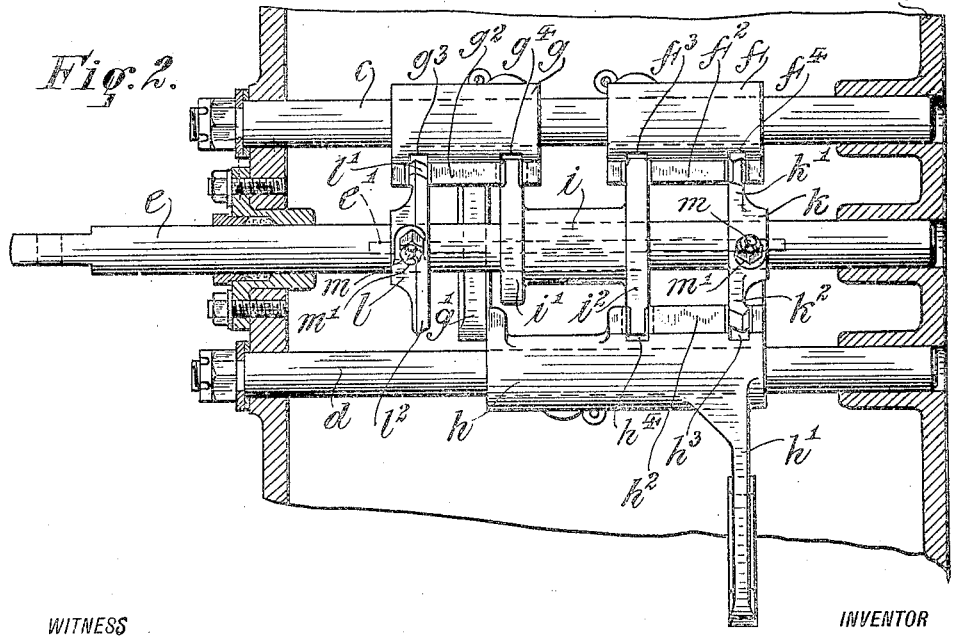
Fig. 2 is a view in plan of the change speed mechanism shown in Fig. 1 taken on a horizontal section through the gear housing in a plane just above the shifter mechanism.
Figure 3:
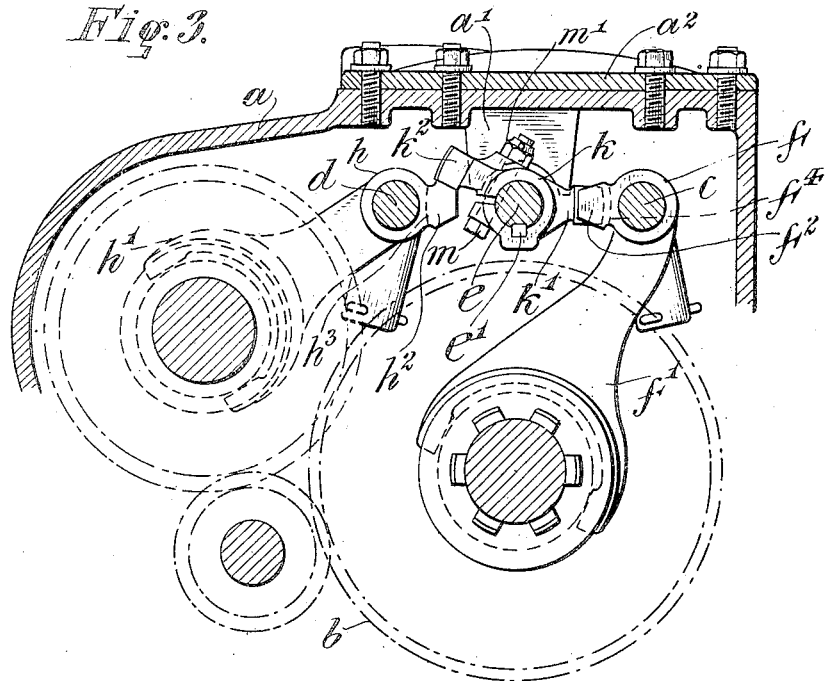
Fig. 3 is a view in transverse vertical section through the shifter mechanism shown in Fig. 1 and showing particularly the relation between the selector shaft, one of the shifter members thereon and two of the shifter forks.
Figure 5:
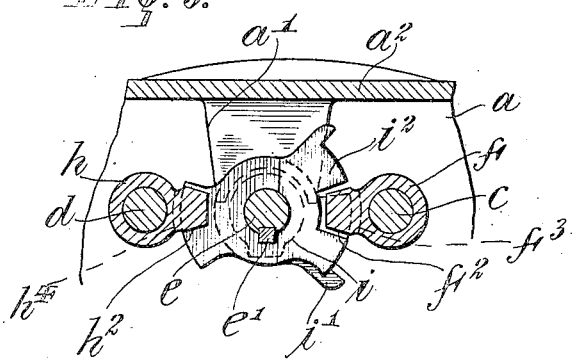
Fig. 5 is a view in transverse section through the shifter rod and supporting rods for the shifter forks showing one of the locking members in elevation.

As illustrated, the rod $c$ has mounted slidably thereon a sleeve $f$ which carries a shifter fork $f'$ adapted to control movement of appropriate gears in the transmission $b$ to give first and second speeds according to the position of the fork. On the same rod $c$ is mounted a sleeve $g$ carrying a shifter fork $g'$ whose position, as determined by the operator, governs the third and fourth speed gears in the transmission $b$. On the other rod $d$ is mounted slidably a sleeve $h$ carrying a shifter fork $h'$ for the appropriate gear for reverse speed. Having the various elements thus far described it will be understood that shifter mechanism therefor must be of such character as to lock in predetermined position all parts which are inoperative in one condition of the transmission while effecting operative connection between the driver's shifting member and the element which needs to be shifted to govern the desired condition in the gear set. It is with this change speed mechanism that the invention is primarily concerned. The selector shaft $e$ as hereinbefore stated, is slidable axially and can be rocked under the control of a suitable actuating member (not illustrated) which is operatively connected therewith in a manner now commonly employed. On this selector shaft $e$ is feathered a sleeve $i$ on each end of which is carried a segmental locking member $i'$, $i^2$. Between the locking members $i'$, $i^2$ rests a stop $a'$ which, in the illustrated embodiment, is formed as an integral dependent rib on the inner wall of the cover plate $a^2$ for the gear box $a$. It is to be understood that some other form of stop conveniently mounted on the gear box may be employed, its function being to hold the sleeve $i$ against axial movement with the selector shaft $e$ while permitting its rocking movement with said shaft. As shown clearly in Fig. 5 the shaft $e$ is provided with a long key $e'$ which slides freely in a key-way in the sleeve $i$ so as to constitute the feathered engagement described.

At one side of the locking member $i'$, $i^2$ is secured to the shaft a shifter member $k$ having segmental shifter fingers $k'$, $k^2$, while at the other side of said locking members is secured on the shaft $e$ a second shifter member $l$ carrying segmental shifter fingers $l'$, $l^2$. A convenient construction of such shifter members contemplates a split collar formed with a clamping bolt $m$ and coöperating nut $m'$ fastened thereon for securing said shifter members adjustably on the shaft.

The sleeves $f$, $g$ and $h$ are preferably formed with elongated bosses $f^2$, $g^2$, $h^2$, respectively, extending generally inwardly toward the locking fingers $i'$, $i^2$ and shifter fingers $k'$, $k^2$, $l'$, $l^2$ and these bosses are provided with entering slots $f^3$, $f^4$, $g^3$, $g^4$ and $h^3$, $h^4$ in the sleeves bearing corresponding reference characters, for the purpose of receiving one of the locking fingers or one of the shifter fingers according to the function of the slot and its relation to said fingers. The slots $f^4$, $h^3$ are adapted to receive the shifter fingers $k'$, $k^2$, respectively; the slots $f^3$, $h^4$ are adapted to receive the locking fingers $i^2$; the slot $g^4$ is adapted to receive the locking finger $i'$ and the slot $g^3$ is adapted to receive the shifter finger $l'$. For mechanical reasons it is preferred to bevel the faces of the bosses $f^2$, $g^2$, $h^2$ and provide on the locking fingers $i'$, $i^2$ radial flanges adapted to engage the beveled faces of the bosses $f^2$, $g^2$, respectively, at the limit of travel of the respective fingers in one direction. This engagement will constitute a rotarial stop for the rock shaft $e$ and automatically position the shifter fingers properly within the slots in which they rest preliminary to movement of the sleeves in which they are formed.

In order to indicate somewhat to the operator the extreme positions of travel of the several forks and to maintain them yieldingly in fixed relation to the respective supporting rods after shifting, each of the sleeves $f$, $g$, $h$, has mounted thereon a spring-pressed detent, indicated generally at $f^5$, $g^5$ and $h^5$, but shown in detail only at $h^5$. The nose of each of these detents $f^5$, $g^5$ is adapted to coöperate with notches such as $c'$, $c^2$, $c^3$, $c^4$ or $c^5$ formed in the rod $c$ and in case of the detent $h^5$ to coöperate with notches $d'$, $d^2$ formed in the supporting rod $d$.

The operation of the improved change speed mechanism can best be understood by reference to Fig. 4 of the drawings in which the elements are thrown into perspective. In this view the parts are shown in the relationship in which they will rest when the reverse gear in the transmission is engaged. The selector shaft $e$ has been rocked to such position as will throw the locking finger $i^2$ in the slot $f^3$ so as to lock the first and second speed fork $f$ positively against axial movement. This position of the shaft $e$ will also throw the locking finger $i'$ into the slot $g^4$ of the sleeve $g$ so as to lock the third and fourth speed fork $g'$ against movement. The shifter finger $l'$ will be thrown out of the slot $g^3$. The lower portion of the locking finger $i^2$ will be thrown out of the slot $h^4$ in the sleeve $h$ for the reverse fork $h'$. The finger $k^2$ of the shifter member $k$ will be thrown into the slot $h^3$ of the sleeve $h$, thereby engaging the shifter fork $h'$ for the reverse gear operatively with the slidable selector shaft $e$. The other finger $k'$ of this shifter device $k$ will be thrown out of engagement with the slot $f^4$ of the sleeve $f$ for the first and second speed fork $f'$. With the parts in the position described axial movement of the selector shaft $e$ will serve to slide the sleeve $h$.

At one extreme position of travel the nose of the detent $h^5$ will engage the notch $d^2$ in the rod $d$ when the reverse gear will be found properly unmeshed. At the other extreme position of travel of the sleeve the detent $h^5$ will engage the notch $d'$ when the parts will be shown in proper "neutral" position preliminary to such selective actuation of the reverse gear.

With the several forks in neutral position, in which they will be, as viewed in Fig. 4, when the sleeve $h$ is slid toward the right until the detent $h^5$ engages the notch $d'$ first and second speeds of the vehicle can be effected by rocking the selector shaft $e$ in a counter-clockwise direction. This will bring the shifter finger $k'$ into the slot $f^4$ and will disengage the finger $k^2$ from the slot $h^3$. It will throw the lower portion of the locking finger $i^2$ into the slot $h^4$ without engaging the elongated upper section thereof from the slot $f^3$. The segmental locking finger $i'$ will remain in the slot $g^4$ and the shifter finger $l'$ will not enter the slot $g^3$. With the parts in this position when the rod $e$ is slid axially so as to move the sleeve $f$ toward the right the nose of the detent $f^5$ will be brought into engagement with the notch $c'$ when the gear will be found positioned for the first speed. If the sleeve is slid to the left, as viewed in Fig. 4, until the nose of the detent $f^5$ rests within the notch $c^3$ then the gearing will be found in proper position to effect second speed.

With the parts in neutral position as described above and the sleeve $f$ in the position shown in Fig. 4 the shaft $e$ can be rocked further in a counter-clockwise direction to bring the shifter finger $l'$ into the slot $g^3$ for shifting for third and fourth speeds. During this rocking the locking finger $i'$ will be carried out of the slot $g^4$. The upper portion of the locking finger $i^2$ will engage in the slot $f^3$, the lower portion thereof will remain in the slot $h^4$, and the shifter fingers, $k'$, $k^2$, will be free from engagement with either of the sleeves $f$ or $h$, respectively. Movement of the shaft $e$ axially toward the right, as viewed in Fig. 4, will slide the sleeve $g$ until the nose of the detent $g^5$ engages the notch $c^3$ in the shaft $e$ when the parts of the gearing will be found in position to effect third speed, whereas if the sleeve $g$ be slid in the opposite direction to its extreme, the detent $g^5$ will engage the notch $c^5$ when the gear is set for fourth speed.

Aside from the action of the several detents $f^5$, $g^5$, $h^5$, in indicating the relative positions of the sleeves in which they are mounted and in arresting the movement of such sleeves in proper position, all of the parts may be so constructed and related as to insure the positive limitation of the limits of travel of the selector shaft $e$ in either direction. For instance, as shown in Fig. 4, the shifter member $k$ is adapted to be brought into engagement with the face of the locking finger $i^2$ when the reverse gear has been moved into proper position. In the same way, the shifter finger $k$ will limit the movement of the selector shaft $e$ when the sleeve $g$ is being moved into position for fourth speed. Conversely, the shifter member $l$ may be so related to the locking finger $i'$ as to engage it or for the purpose of sliding the sleeve $f$ to position for first speed in the gear set. Such positive engagement of parts will, of course, absolutely prevent overrunning in any one of the positions.

The description given is thought to be clear. It is again to be emphasized that the automatic locking and picking up arrangement on which the invention is based can be incorporated in connection with transmissions of any approved change speed type and the parts employed or their equivalents can be constructed of different forms from those herein illustrated and be differently related without departing from the spirit of the invention.

I claim as my invention:

1. Change speed mechanism comprising slidable shifter forks, a selector shaft, locking members for the forks feathered on the shaft and means to hold the locking members against displacement.

2. Change speed mechanism comprising slidable shifter forks, a selector shaft, locking members for the forks feathered on the shaft and a stop mounted on the gear case to hold the locking members against axial displacement.

3. Change speed mechanism comprising slidable shifter forks, a selector shaft, a sleeve feathered on the shaft, locking members for the forks carried on the sleeve and means to hold the sleeve against axial displacement.

4. Change speed mechanism comprising slidable shifter forks, a selector shaft, locking members for the forks feathered on the shaft, means to hold the locking members against axial displacement and independent shifter devices secured to the shaft for selective engagement of the forks.

5. Change speed mechanism comprising slidable shifter forks, a selector shaft, locking members for the forks feathered on the shaft, means to hold the locking members against axial displacement and independent shifter devices secured to the shaft for selective engagement of the forks, said shifter forks being provided with slots to receive the shifter devices and with independent slots to receive the locking members.

6. Change speed mechanism comprising slidable shifter forks, a selector shaft, locking members for the forks feathered on the shaft and a stop mounted on the gear case to hold the locking members against axial displacement, said stop serving to limit the travel of the selector shaft in shifting.

7. In a change speed gear box, shifter mechanism comprising a slidable rock shaft, fixed rods, shifter forks mounted slidably on said rods, a locking member for the forks comprising a sleeve feathered on the shaft and having integral fingers thereon to engage the forks selectively, a stop to hold the sleeve against axial movement, and shifter fingers fixed on the shaft to engage the shifter forks selectively.

8. In a change speed gear box, shifter mechanism comprising a slidable rock shaft, fixed rods, shifter forks for the first and second speeds and for the third and fourth speeds supported slidably on one of said rods, a fork for the reverse gear supported slidably on the other of said rods, a locking member for the forks comprising a sleeve feathered on the shaft and having an integral finger to engage the third and fourth speed fork and having another integral finger to engage the first and second speed fork and the reverse fork, a stop to hold the sleeve against axial movement, a shifter member on the rock shaft to engage the third and fourth speed fork, and an independent shifter member carried on said shaft to engage the first and second speed fork and also the reverse speed fork.

9. In a change speed gear box, shifter mechanism comprising a slidable rock shaft, fixed rods, sleeves mounted slidably on said rods and carrying, respectively, shifter forks for first and second speed, for third and fourth speed and for reverse, locking members, and independent shifter members on the rock shaft to engage the supporting sleeves for said forks respectively, bosses formed on the sides of the sleeves of the shifter forks having beveled faces and provided with slots to receive the locking and shifter members selectively, and fingers on the locking members to engage the beveled faces in extreme angular positions on the rock shaft.

This specification signed this 13th day of July, A. D. 1920.

MAXIMILIAN C. FRINS.